United States Patent
Sirola et al.

(10) Patent No.: US 6,415,138 B2
(45) Date of Patent: *Jul. 2, 2002

(54) WIRELESS COMMUNICATION DEVICE AND A METHOD OF MANUFACTURING A WIRELESS COMMUNICATION DEVICE

(75) Inventors: Jukka Sirola, Tampere; Tapani Jokinen, Turku, both of (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,857

(22) Filed: Nov. 19, 1998

(30) Foreign Application Priority Data

Nov. 27, 1997 (FI) .................................................. 974347

(51) Int. Cl.⁷ .................................................. H09B 1/02
(52) U.S. Cl. .......................... 455/90; 455/347; 455/575; 455/566; 345/173
(58) Field of Search ............................... 455/90, 91, 95, 455/73, 566, 575, 347, 423, 557, 154.2, 158.2, 158.4, 158.5; 379/93.19; 345/173, 174, 867

(56) References Cited

U.S. PATENT DOCUMENTS

| | | | | |
|---|---|---|---|---|
| 4,206,369 A | * | 6/1980 | Lewiner et al. ............. | 307/125 |
| 5,038,401 A | * | 8/1991 | Inotsume ...................... | 455/92 |
| 5,170,494 A | | 12/1992 | Levanto ....................... | 455/90 |
| 5,189,632 A | | 2/1993 | Paajanen et al. ........ | 364/705.05 |
| 5,229,701 A | | 7/1993 | Leman et al. .................. | 320/2 |
| 5,253,146 A | | 10/1993 | Halttunen et al. .......... | 361/784 |

(List continued on next page.)

FOREIGN PATENT DOCUMENTS

| | | |
|---|---|---|
| EP | 0 366 832 A1 | 5/1990 |
| EP | 0664 504 A2 | 7/1995 |
| EP | 0 731 589 A2 | 9/1996 |
| EP | 0 802 659 A1 | 10/1997 |
| EP | 0 813 328 A2 | 12/1997 |
| EP | 0 859 498 A2 | 8/1998 |
| FI | 95178 | 9/1995 |
| GB | 2 291 560 B | 1/1996 |
| GB | 2 297 661 A | 8/1996 |
| GB | 2 297 662 A | 8/1996 |

(List continued on next page.)

Primary Examiner—William Trost
Assistant Examiner—Conguan Tran
(74) Attorney, Agent, or Firm—Perman & Green, LLP

(57) ABSTRACT

The present invention relates to a wireless communication device (1) comprising a housing (2), a touch sensitive display (3) coupled to the housing (3), the display (3) comprising preferably a plurality of activation areas (3b–3d) for activating the functions of the wireless communication device (1) by pressing the activation areas (3b–3d), and a cover part (4) coupled to the housing (2) and arranged to move in relation to the touch sensitive display (3). The cover part (4) comprises at least one activation means (5), wherein in the closed position of the cover part (4), the activation means (5) is arranged to transmit the pressing of the activation means (5) to the activation area (3b–3d) located at the activation means (5) In an advantageous embodiment of the invention, the activation means (5) is formed advantageously to correspond in size to the touch sensitive display (3), advantageously to a completely transparent and flexible foil-like activation means (5). Further, with the cover part (4) in the closed position, the activation means (5) is adapted at a selected distance from the touch sensitive display (3), and in relation to the touch sensitive display (3) preferably substantially parallel. The present invention also relates to a method in manufacturing a wireless communication device (1).

10 Claims, 3 Drawing Sheets

U.S. PATENT DOCUMENTS

Figure 1:
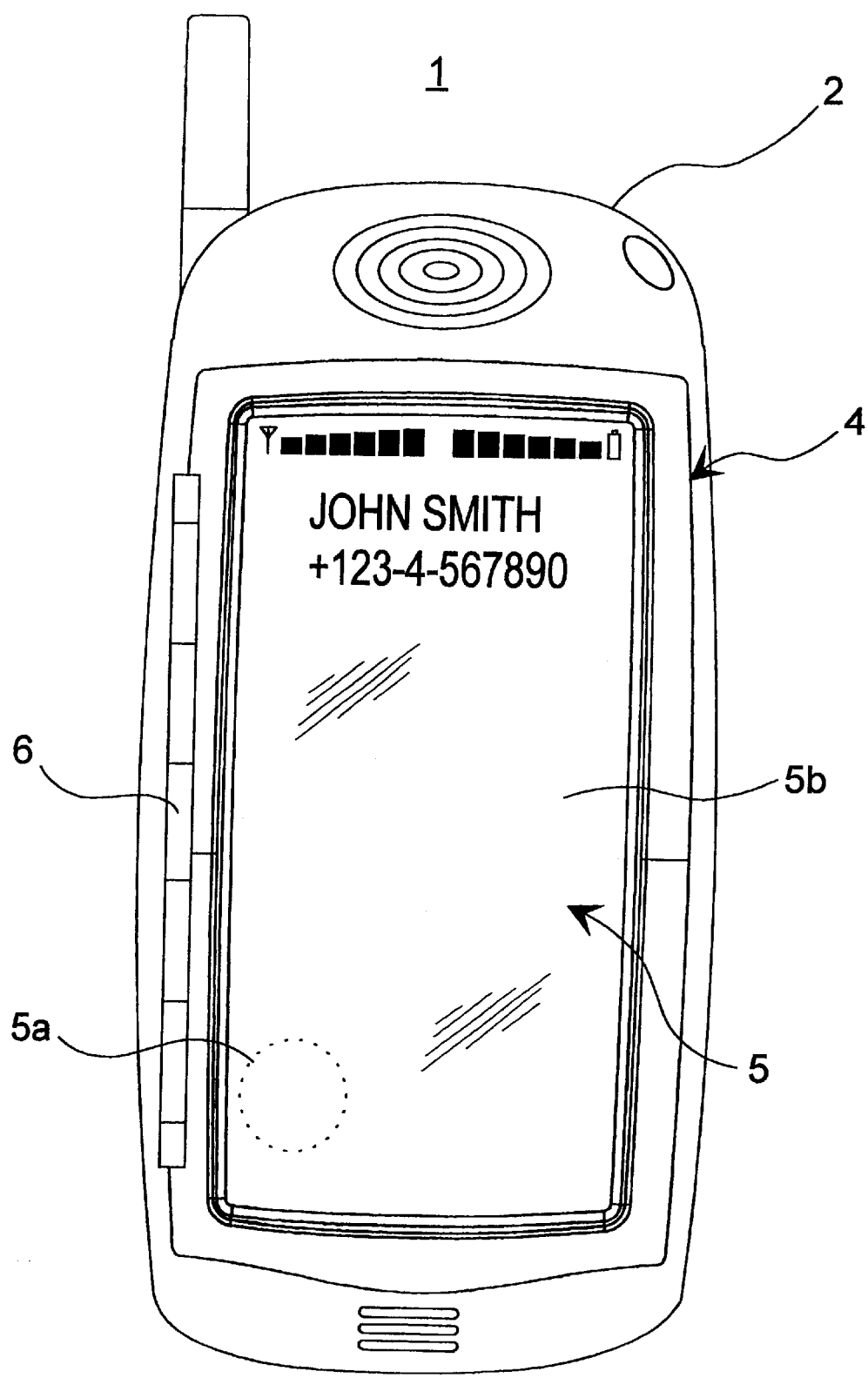

| | | | |
|---|---|---|---|
| 5,265,158 A | | 11/1993 | Tattari ........................ 379/433 |
| 5,271,056 A | | 12/1993 | Pesola et al. .................. 379/58 |
| 5,361,459 A | | 11/1994 | Hyvonen et al. ............... 24/35 |
| 5,572,573 A | * | 11/1996 | Sylvan et al. .................. 379/61 |
| 5,584,054 A | * | 12/1996 | Tyneski et al. ................ 455/89 |
| 5,603,103 A | | 2/1997 | Halttunen et al. ............. 455/90 |
| 5,642,402 A | | 6/1997 | Vilmi et al. ................... 379/58 |
| 5,669,069 A | | 9/1997 | Rautila ........................ 455/558 |
| 5,719,936 A | * | 2/1998 | Hillenmayer ............... 379/447 |
| 5,761,485 A | * | 6/1998 | Munyan ..................... 395/500 |
| 5,768,370 A | | 6/1998 | Maatta et al. ................ 379/433 |
| 5,779,115 A | | 7/1998 | Parkas et al. ............... 224/272 |
| 5,787,341 A | | 7/1998 | Parkas et al. .................. 455/90 |
| 5,809,115 A | | 9/1998 | Inkinen .................... 379/93.05 |
| 5,886,687 A | * | 3/1999 | Gibson ........................ 345/173 |
| 5,896,575 A | * | 4/1999 | Higginbotham et al. ..... 455/566 |
| 5,990,874 A | * | 11/1999 | Tsumura et al. ............. 345/173 |
| 6,009,338 A | * | 12/1999 | Iwata et al. .................. 455/575 |
| 6,259,491 B1 | * | 7/2001 | Ekedahl et al. ................ 349/23 |

FOREIGN PATENT DOCUMENTS

| | | |
|---|---|---|
| GB | 2 299 302 A | 10/1996 |
| WO | WO 98/29886 | 7/1998 |

* cited by examiner

WIRELESS COMMUNICATION DEVICE AND A METHOD OF MANUFACTURING A WIRELESS COMMUNICATION DEVICE

BACKGROUND OF THE INVENTION

1. Field of the Invention

The present invention relates to a wireless communication device comprising a housing, a touch sensitive display coupled to the housing, the display comprising preferably a plurality of activation areas for activating the functions of the wireless communication device by pressing the activation areas, and a cover part coupled to the housing and arranged to move in relation to the touch sensitive display, said cover part comprising at least one activation means, wherein in the closed position of the cover part, the activation means is arranged to transmit the pressing of the activation means to the activation area located at the activation means. The present invention further relates to a method of manufacturing a wireless communication device, said wireless communication device comprising a housing, a touch sensitive display coupled to the housing, the display comprising preferably a plurality of activation areas for activating the functions of the wireless communication device by pressing the activation areas, and a cover part coupled to the housing and arranged to move in relation to the touch sensitive display, said cover part comprising at least one activation means, wherein in the closed position of the cover part, the activation means is arranged to transmit the pressing of the activation means to the activation area located at the activation means.

2. Prior Art

To facilitate mobility of people, prior art wireless communication devices can be used, such as cordless telephones and mobile stations. One mobile station that has gained very large popularity is a mobile phone, which can e.g. be a digital mobile phone employing the GSM standard (Global System for Mobile Communications) and operating in a mobile communication system based on the cellular network.

It is known that for storing different data, devices such as notebook computers, small portable computers or PDA devices (Personal Digital Assistants) can be used. To these devices the user can store e.g. calendar data, notes, address data, telephone numbers or corresponding information. Data is input to these devices usually by using a keypad, but it is known that also such devices are available, which are provided with touch sensitive display to control the functions of the devices by touching. Thus, in order to activate the functions of the device it is possible to select commands or activation areas of menus on the display, e.g. by pressing with finger, or text data can be stored into the device by writing it directly to the touch sensitive display by using e.g. a pen-like object. Efficiency of these devices is constantly improving and these devices already include a plurality of properties known from PC devices (Personal Computers). For some devices extension cards in accordance with PCMCIA standard (Personal Computer Memory Card International Association) are available for coupling these devices to mobile phones. Thus, e.g. by PDA devices it is possible, by utilizing radio waves, to send and receive in a wireless manner e.g. facsimile messages, SMS messages (Short Message Service) or other text files. In the present specification, PDA devices denote devices in accordance with the above description.

It is known that also devices are available, wherein the functions of a wireless communication device and a PDA device are combined. One such known device is the Nokia Communicator 9000, which enables connection with Internet network, mobile phone functions, such as receiving an incoming call and dialling a telephone number, and e.g. receiving facsimile messages. Properties of wireless communication devices, such as mobile phones, are constantly increasing and include usually functions for e.g. storing telephone numbers of persons and companies. In the present specification wireless communication devices also denote a wireless device which includes functions of the above-described PDA device or the like.

One known device of the above-described type is described also in patent GB-2291560. The device comprises a touch sensitive display coupled to a housing, wherein the functions of the device can be controlled by touching the activation areas of the display. The touch sensitive display further comprises a display area wherein e.g. data known from mobile phones, such as telephone numbers, can be shown. In connection with the touch sensitive display operates a stiff cover part, which is arranged moveable by a hinge and can be turned into closed position to cover the touch sensitive display. In apertures made in the cover part also mechanically actuating activation means, i.e. keys, are arranged in a manner that when pressing the activation means with the cover part in the closed position they touch the activation areas of the touch sensitive display and thus transmit e.g. a pressing of a finger to the display in order to activate the functions of the device. The device described in patent GB-2291560 operates as a mobile phone with the cover part in the closed position. The device also operates as a PDA device with the cover part in the open position, wherein the functions of the device can be controlled by directly touching the activation areas of the display, e.g. by using a finger. When the cover part is in the open position pressing the keys has no effect, because with the cover part in this position the motion of the keys does not reach the touch sensitive display. The hinge of the cover part of the device is provided with a sensor switch detecting the position of the cover part and controlling the operation of the device. The cover part further operates as a cover protecting the touch sensitive display. In accordance with prior art, also such mobile phones are available which have a planar, non-transparent, stiff cover protecting the keys and positioned in the housing of the mobile phone in a manner that it can be opened and closed. In the cover, also an aperture is arranged, through which the display or display area of the mobile phone is readable. Often in the cover also a microphone of the mobile phone is positioned, wherein the cover has to be opened for the call.

However, a versatile and easy use of the device described in patent GB-2291560 is cumbered by the fact that for activating the PDA functions, the cover part of the device has to be moved to its opened position. Another disadvantage is that the aperture of the cover part has to be large for large quantities of data, such as text messages or lists, to be shown on the display also when the cover part is closed. This leads to a large size of the device itself, and to the fact that the device is difficult to use, because the cover part has to be provided also with keys. A drawback of the device is particularly the fact that the keys of the cover part are always in constant positions and provided with constant markings. Thus, in case the order of the keys is wished to be changed or the function of a key is wished to be changed, the cover part with the keypad has to be changed. In addition, even if it were possible to redefine the quantity, area and position of the activation areas of the touch sensitive display which are positioned at the place of the keys of the cover part and correspond to the keys, one would have to limit to such positioning and functions of the activation areas, for which cover parts with appropriate keys are available.

SUMMARY OF THE INVENTION

The aim of the present invention is to eliminate the above-mentioned drawbacks and, to a great extent, to make the use of a wireless communication device, such as a mobile phone, more effective and, at the same time, more simple. The invention is based on the idea that a plurality of separate keys in the cover part of a prior art wireless communication device correspond to an advantageously one, flexible, foil-like and transparent activation means arranged on the cover part of a wireless communication device of the present invention. Thus, the activation of the functions of the wireless communication device is performed with the cover part in the closed position by pressing the activation means at an appropriate point, advantageously located at the activation area. To be more precise, the wireless communication device according to the present invention is characterized in that the activation means is formed advantageously to correspond in size to the touch sensitive display, advantageously to a completely transparent and flexible foil-like activation means. In accordance with the invention, the method of manufacturing a wireless communication device is characterized in that the activation means is formed advantageously to correspond in size to the touch sensitive display, advantageously to a completely transparent and flexible foil-like activation means.

The wireless communication device of the invention provides many considerable advantages. The cover part of the device of the invention operates in the closed position advantageously protecting the entire touch sensitive display and at the same time making it possible advantageously to read the entire display without opening the cover. By using a transparent cover part it is not necessary to manufacture an aperture for reading the display, and the display can be read, also at the location of the activation means, in the area under the activation means, with the cover part in the closed position. Thus, the size of the display can be enlarged for showing a larger quantity of data and for facilitating the reading without making the device larger. In the portion of the display under the transparent activation means it is possible to show changing data related to the activation areas, instruction texts and figures, such as bar charts. The cover part operates in the closed position to protect the display from surrounding conditions, a further object of it being to avoid unintentional pressings. The power required in connection with pressing to move the flexible foil-like activation means and to initiate a contact between the activation means and the touch sensitive display is easy to adjust by changing the thickness of the foil.

A further considerable advantage of the wireless communication device in accordance with the invention is that due to the transparent cover part it is possible to implement within the same device e.g. for the user to be chosen a plurality of standardized orders for the activation area, and to use said orders also with the cover part in the closed position on the touch sensitive display. If necessary, also the user can define his or her own orders or locations for the activation areas, such as menus, e.g. for activation of mobile phone functions or PDA functions. A transparent and foil-like activation means allows free design and positioning of the activation areas, as well as activation of functions corresponding to these activation areas also with the cover part in the closed position. Consequently, it is not necessary to change the cover part, because the foil-like activation means allows a more free pressing of its different parts than when using a prior art cover part provided with keys.

A further particular advantage of the device in accordance with the invention is that by a foil-like activation means it is easy to implement, if necessary, also menu functions based on continuous and simultaneous sliding press. A further advantage is that with the cover part closed, also the PDA functions of the device can be used, and that in a corresponding manner mobile phone functions can be used also with the cover part open. A further particular advantage of one advantageous embodiment of the invention is that wearing of markings made in the activation part takes place in a smaller scale than in prior art keys, where markings have to be exposed on their upper surface, which is also pressed e.g. by a finger.

Figure 2:
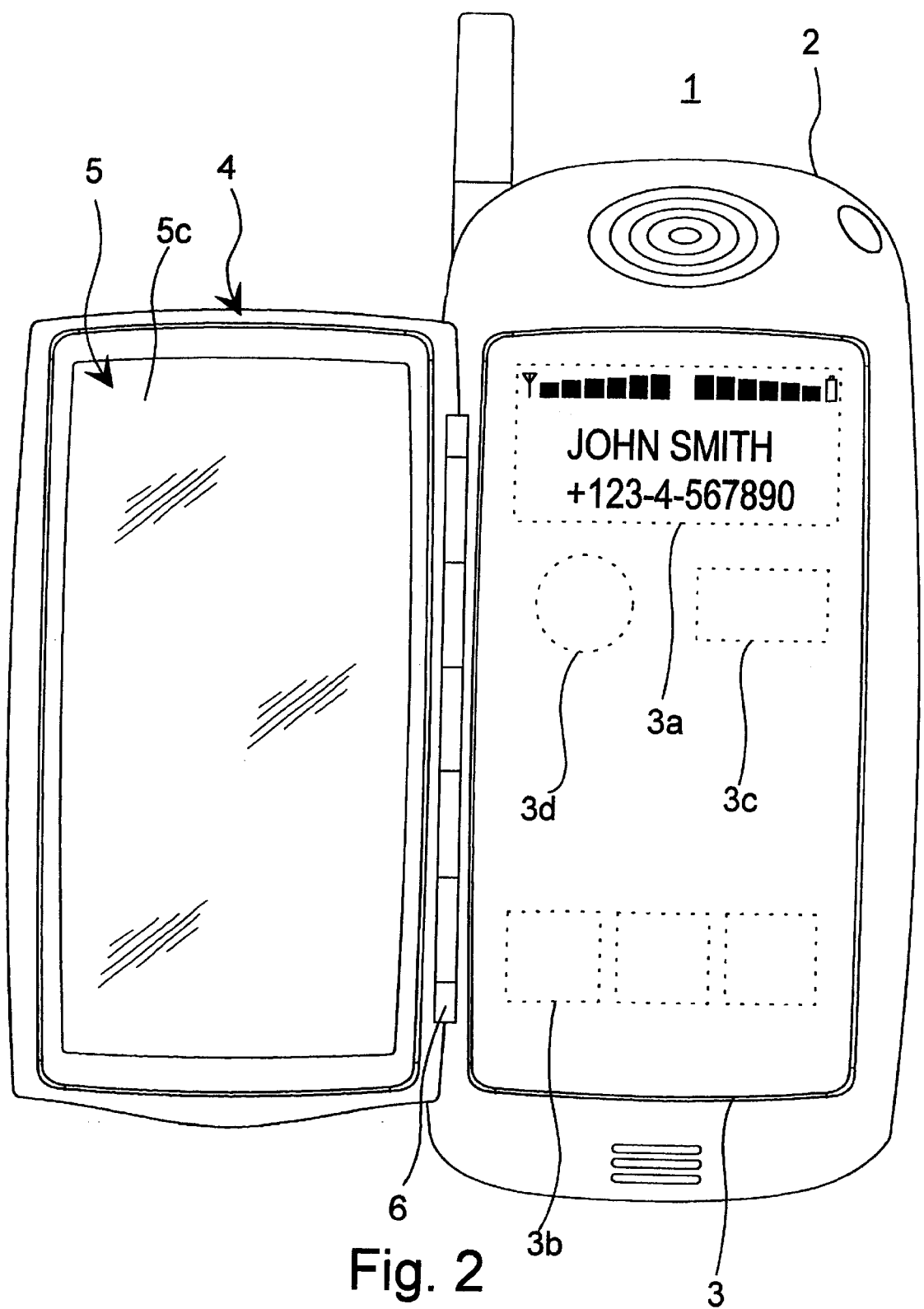
Figure 3:
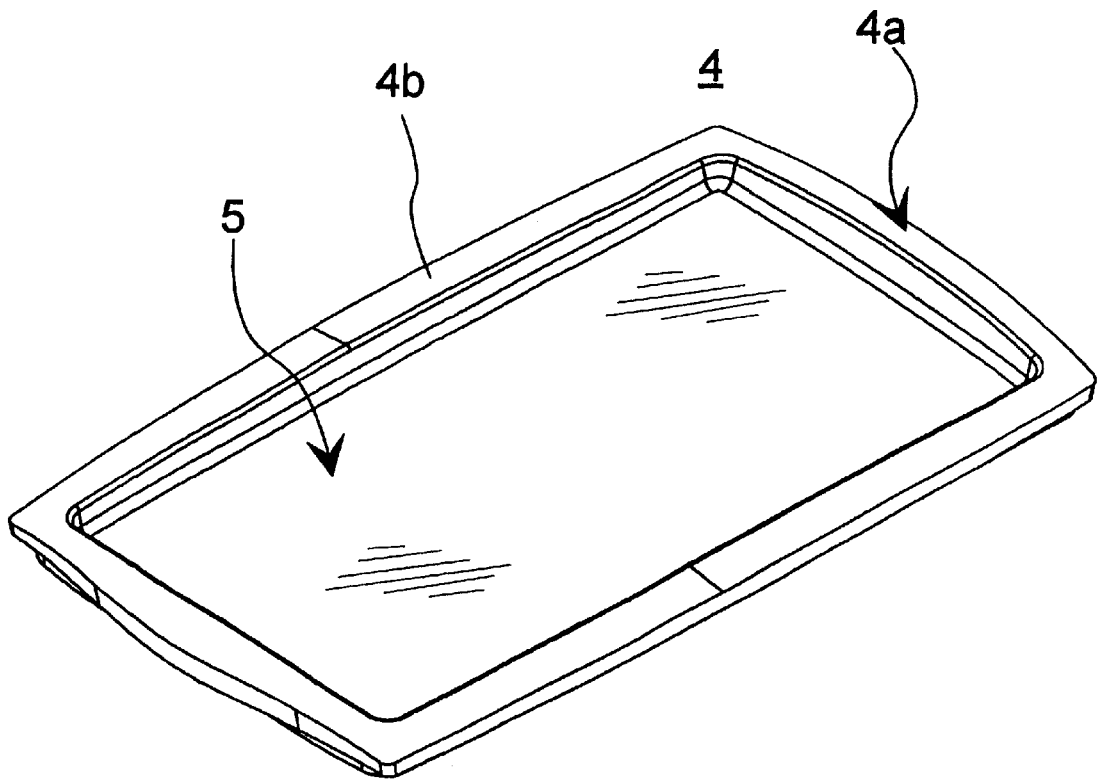
Figure 4:
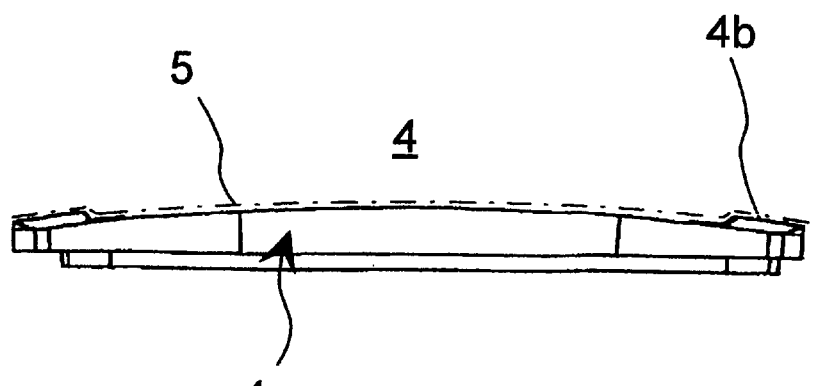

In the following, the invention is described in more detail by using one advantageous embodiment with reference made to the accompanying drawings, wherein FIG. 1 shows one advantageous embodiment of the invention seen from the front and with the cover part in the closed position, FIG. 2 shows one advantageous embodiment of the invention seen from the front and with the cover part in the opened position, FIG. 3 shows the cover part of one advantageous embodiment of the invention in perspective diagram, and FIG. 4 shows the cover part of one advantageous embodiment of the invention seen from the end.

FIG. 1 illustrates one advantageous embodiment of the invention seen from the front with the cover part in the closed position. FIG. 2 illustrates one advantageous embodiment of the invention seen from the front and with the cover part in the opened position. With reference made to FIGS. 1 and 2, a wireless communication device 1 of the invention, referred to as a device 1, comprises a housing 2 and a touch sensitive display 3 coupled to the housing 2. The touch sensitive display 3 is e.g. an LCD display (Liquid Crystal Display), which recognizes also a very slight touch. The LCD display is provided e.g. with a touch sensitive foil or a corresponding technique known as such recognizing also the touch point. This touch sensitive display 3 comprises preferably a plurality of activation areas 3b–3d for activating the functions of the device 1 by touching the activation areas 3b–3d, and advantageously at least one display area 3a for showing variable data, such as a telephone number, short messages, the state of the accumulator of the device 1 and the intensity of the signal received by the device 1. The user activates functions usually by using a finger and a light pressing, but the pressing can also be performed by a pen-like object or the like, in case the identification technique used at the time allows. The points to be pressed, i.e. the activation areas 3b–3d for activating different functions of the device 1, can be shown on the display 3 of the device 1 by orthogons, circles or corresponding figures drawn by the control programme of the device 1, in connection with which figures also instructions, symbols of the function or other markings are written, if needed. The size and positioning of these activation areas 3b–3d and the display area 3a can vary. The device 1 further comprises a cover part 4 coupled to the housing 2 and arranged to be movable in relation to the touch sensitive display 3, which cover part 4 comprises at least one activation means 5. In the closed position of the cover part 4 the activation means 5 is arranged to transmit a pressing of the activation means 5, e.g. by a finger, to the activation area 3b–3d at the location of the activation means 5. The activation means 5 of the device 1 is formed advantageously to have the same size with the touch sensitive display 3, forming advantageously a thoroughly transparent and flexible foil-like activation means 5. The activation means 5 having the same extent as the display 3, it is possible to select activation areas 3b–3d located in any area of the display 3. The activation means 5 being thoroughly transparent it is also possible to read data on the whole display 3 area. The activation means 5 is manufactured advantageously of plastic material, such as polycarbonate (PC plastic), wherein the thickness of the foil-like activation means 5 is advantageously between 0.3 mm and 1.0 mm. It is obvious that the thickness can vary according to its place e.g. in case e.g. bossages or pimples are formed, on a surface 5c on the side of the display 3 of the activation means 5 for making the contact between the activation means 5 and the display 3 more efficient. By increasing the thickness of the foil-like activation means 5 it is possible to increase the rigidity of the activation means 5. The rigidity has to be chosen to be appropriate for the pressing for activating the functions of the device 1 to exert to the right activation area 3b–3d and to avoid the need for excessive pressing force. The extent of the foil-like activation means 5 has a substantial effect on its operation. Also the design of the activation means 5, e.g. a convex form of surface can have an effect on its rigidity. Preferably the activation means 5 is planar, i.e., substantially parallel with the planar display 3. By selecting an appropriate rigidity, the activation means 5 prevents unintentional, usually light pressings from activating functions.

In the closed position of the cover part 4 of the device 1 the activation means is adapted to a selected distance from the touch sensitive display 3 and preferably to be substantially parallel with it. Thus, the activation means 5 is in this rest position adapted in its entirety advantageously to about a distance of 1 mm from the normally planar display 3. However, it is obvious that the distance can, according to its place, vary from this measure, e.g. due to changes in dimension or wearing of the curved forms of the cover part 4 or parts leaning to the housing 2 of the cover part 4. Thus, in the area of the activation means 5, at different parts thereof, a different scope of flexible movement of the activation means 5 is required, for it to form a contact when pressing one of the activation areas 3b–3d on the display 3.

Further, with reference made to FIGS. 1 and 2, with the cover part 4 of the device 1 in the closed position, at the activation means 5 preferably a plurality of activation areas 3b–3d are positioned. In connection with the above-mentioned prior-art solution each activation means, i.e. key is corresponded by one activation area and one function, e.g. a number key. In the closed position of the cover part 4 of the device 1 in accordance with the present invention the activation means 5 is arranged to transmit the pressing of the activation means 5 to an activation area 3b–3d located at the activation means 5 by means of a movement directed towards the touch sensitive display of the pressing point 5a of the activation means and a contact formed between the activation means 5 and the activation area 3b–3d. By pressing e.g. by a finger the foil-like activation means 5 on the pressing point 5a of its upper surface 5b towards the display 3, the foil-like activation means 5 bends elastically and moves substantially in a perpendicular manner towards the display 3, until its lower surface 5c, i.e. the surface 5c on the side of the display 3 forms a contact with a chosen activation area 3b–3d of the display 3. By lifting the finger off the activation means 5, the activation means is advantageously returned due to its rigidity back to its rest position, wherein contact is no longer formed. The contact is advantageously maintained during the time the activation means 5 is pressed towards the display 3. Pressings are possible, preferably on the area of the entire foil-like activation means 5, e.g. exactly at the point 5a. In the rest position the activation means 5 is planar and when pressing the activation means 5 on its upper surface 5b is formed, seen from the pressing direction, a pit-formed area, the extent of which is based on the rigidity of the flexible activation means 5. On the lower surface 5c of the activation means 5, in a corresponding manner, on a pressing point 5a thereof a peak is formed, said peak forming a contact with the touch sensitive display 3 and thus transmitting the press to the activation area 3b–3d. The contact area between the peak that is formed and one activation area 3b–3d is advantageously smaller than the size of said activation area 3b–3d. In this manner the contact point can be exhibited on an exact basis.

Further, with reference made to FIGS. 1 and 2, the cover part is arranged rotatable in relation to the housing part 2 by means of a hinge 6, wherein the cover part 4 can be turned away from the display 3, and wherein the touch sensitive display 3 can be touched directly, e.g. by a finger, without the contact of the activation means 5. The cover part 4 can be arranged substantially to rotate in relation to an axle that is vertically or transversely parallel with the device 1. The cover part 4 can also be arranged to move substantially parallel with the longitudinal axle of the device 1, wherein the cover part 4 can be slid either entirely or partially from the display 3. A device 1, i.e., a wireless communication device 1 and a touch sensitive display 3 are known as such, so a more detailed description is not necessary.

FIG. 3 shows a perspective image of a cover part of one advantageous embodiment of the invention. FIG. 4 shows a cover part of one advantageous embodiment of the invention seen from the end. With reference made to FIGS. 3 and 4, the cover part 4 comprises a peripheral and substantially oblong frame 4a, wherein the activation means 5 is arranged to close an aperture formed in the frame 4a. With reference made to FIG. 4, the location of the activation means 5 is illustrated by using broken lines, wherein the activation means 5 is connected to the upper surface 4b of the frame 4a. The cover part 4 and the foil-like activation means 5 are manufactured e.g. by injection molding by using IMD technique (In-Mold Decoration) known as such.

The manufacture takes place e.g. according to the following example. An IMD foil formed by a foil-like activation means 5 is connected advantageously to a support foil supplied from a roll, this support foil being supplied through an injection molding form. When the injection molding form is closed the support foil and the IMD foil are locked at their place in the cavity of the injection molding form, wherein also manufacturing material for the frame 4a is supplied, preferably PC plastic or acrylonitrile butadiene styrene (ABS plastic). Due to heat effect the IMD foil is connected to the frame 4a and they together form a cover part 4 provided with activation means 5 formed of IMD foil. Subsequent to the injection molding, the injection molding form is opened and the manufactured cover part 4 is separated from a support band. On the IMD foil also text and figures can be printed, these passing over also to the finished cover part 4, either at the point of the frame 4a or the activation means 5. In addition, it is obvious that the foil-like activation means 5 can at least partially be coloured, darkened or covered with non-transparent colour areas, such as orthogons, texts or other figures. Thus, these figures are preferably placed inside an IMD foil between different layers or on the surface that corresponds to the lower surface 5c of the activation means 5. Due to this, the markings wear less than in prior art devices. According to another example, the cover part 4 and the foil-like activation means 5 are manufactured in accordance with a method known as such by using back moulding technique. E.g. on the verso or the face of a foil sheet manufactured of PC plastic, printing ink is printed, whereafter the foil sheet is pre-molded to have its final form, e.g. by a male mold by using heat and atmospheric pressure. Extra material is cut off from the molded foil sheet and the thin foil part having the form of the final piece is brought to the injection molding form where, on the wished points of its verso, ABS or PC plastic is injection molded. The injection molded plastic gives the piece that is formed its final rigidity.

It is obvious that the invention is not limited to the example described above, but it can be modified within the accompanying claims. Thus, the wireless communication device 1 of the invention can also comprise a separate display, which is not a touch sensitive display and which is used for showing data mentioned in connection with above-mentioned display area 3a of the touch sensitive display 3. This separate display can also be located in a place which is not protected by a cover. It is also obvious that the wireless communication device according to the invention can comprise a plurality of cover parts, at least one of which being in accordance with the cover part 4 described above. Additionally, it is obvious that the cover part 4 can comprise a plurality of separate foil-like activation means 5.

What is claimed is:

1. A wireless communication device comprising:
   a housing,
   a touch sensitive display coupled to the housing, the display comprising a plurality of activation areas for activating the functions of the wireless communication device by pressing the activation areas, and
   a cover part coupled to the housing and arranged to move in relation to the touch sensitive display, said cover part comprising at least one activation means, wherein in a closed position the activation means is adapted to mechanically transmit a pressing of the activation means to the activation areas, wherein the activation means is formed, advantageously to correspond in size to the touch sensitive display, advantageously to a completely transparent and flexible foil activation means, the flexible foil being adapted to mechanically transmit the pressing of the foil to the display;
   wherein when the cover part is in the closed position, the activation means is arranged to transmit the pressing of the activation means to an activation area at the location of the activation means by means of a movement of a pressing point of the activation means directed towards the touch sensitive display and a contact formed between the activation means and the activation area.

2. A wireless communication device according to claim 1, wherein when the cover part is in the closed position, the activation means is at a selected distance from the touch sensitive display, and substantially parallel in relation to the touch sensitive display.

3. A wireless communication device according to claim 1, wherein when the cover part is in the closed position, the location of the activation means corresponds to a location of a plurality of activation areas.

4. A wireless communication device according to claim 1, wherein the cover part comprises a peripheral and substantially oblong frame, and wherein the activation means is arranged to close an aperture formed in the frame.

5. A method of manufacturing a wireless communication device, said wireless communication device comprising:
   a housing,
   a touch sensitive display coupled to the housing, the display comprising a plurality of activation areas for activating the functions of the wireless communication device by pressing the activation areas, and
   a cover part coupled to the housing and arranged to move in relation to the touch sensitive display, said cover part comprising at least one activation means, wherein in a closed position the activation means is adapted to mechanically transmit a pressing of the activation means to the activation areas, wherein the activation means is formed advantageously to correspond in size to the touch sensitive display, advantageously to a completely transparent and flexible foil activation means, the flexible foil being adapted to mechanically transmit the pressing of the foil to the display;
   wherein with the cover part in the closed position, the activation means is adapted to transmit the pressing of the activation means to one of the activation areas at the location of the activation means by means of a movement of a pressing point directed towards the touch sensitive display of the activation means and a contact formed between the activation means and each of the activation areas.

6. A method according to claim 5, wherein with the cover part in the closed position, the activation means is adapted to be positioned at a selected distance from the touch sensitive display, and in a substantially parallel relation to the touch sensitive display.

7. A method according to claim 5, wherein with the cover part in the closed position, the location of the activation means corresponds to a location of a plurality of activation areas.

8. A method according to claim 5, wherein the cover part comprises a peripheral and substantially oblong frame, and wherein the activation means is arranged to close the aperture formed in the frame.

9. A wireless communication device comprising:
   a touch sensitive display coupled to a housing for the device, the display including a plurality of activation areas adapted to be pressed in order to activate the functions of the wireless device, wherein each activation area is adapted to be located in a variable position and have a variable size depending on a function of the device selected by the user; and
   a cover part coupled to the housing and arranged to move in relation to the touch sensitive display, the cover part including a transparent and semi-rigid media corresponding to a size of the touch sensitive display, the media adapted to be pressed and mechanically activate a corresponding activation area on touch sensitive display when the cover part is in a closed position, the media adapted to transmit a pressing of the media to the touch sensitive display.

10. The device of claim 9, wherein the media comprises a flexible plastic film.

* * * * *